June 30, 1970 P. A. ROUSSEL 3,517,900
PROCESS AND APPARATUS FOR DETECTING ICE FORMATION
Filed June 11, 1968
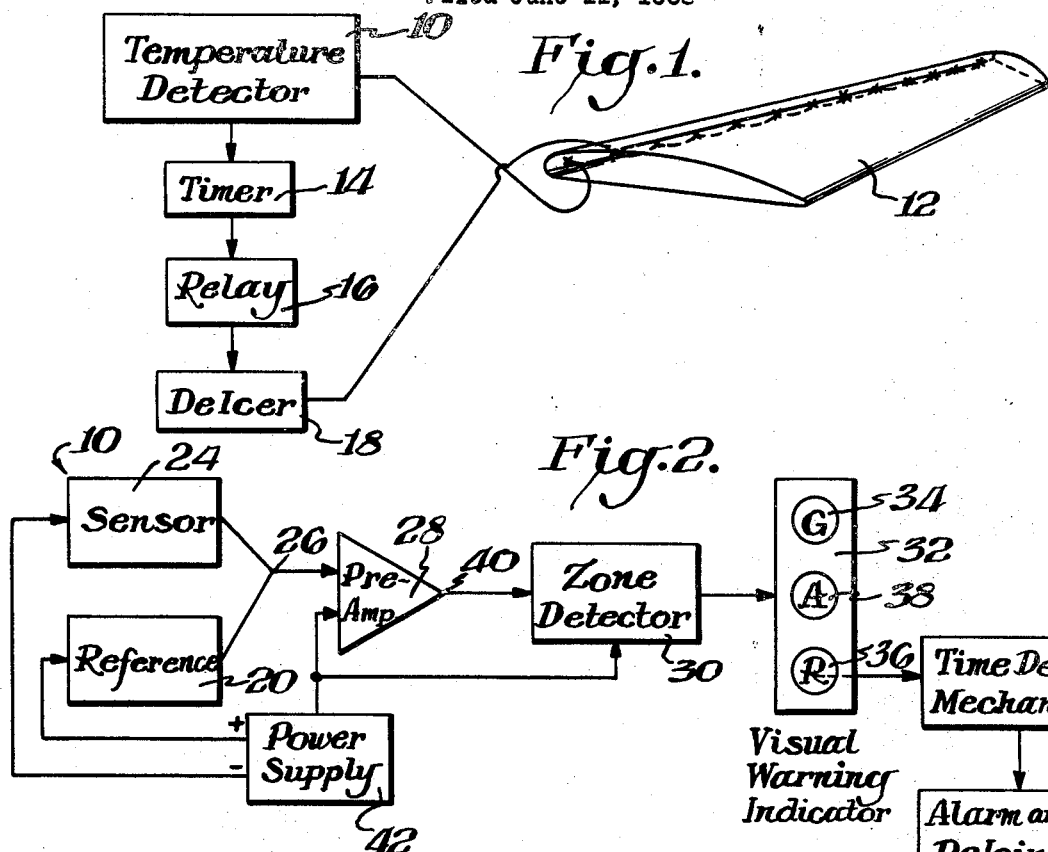
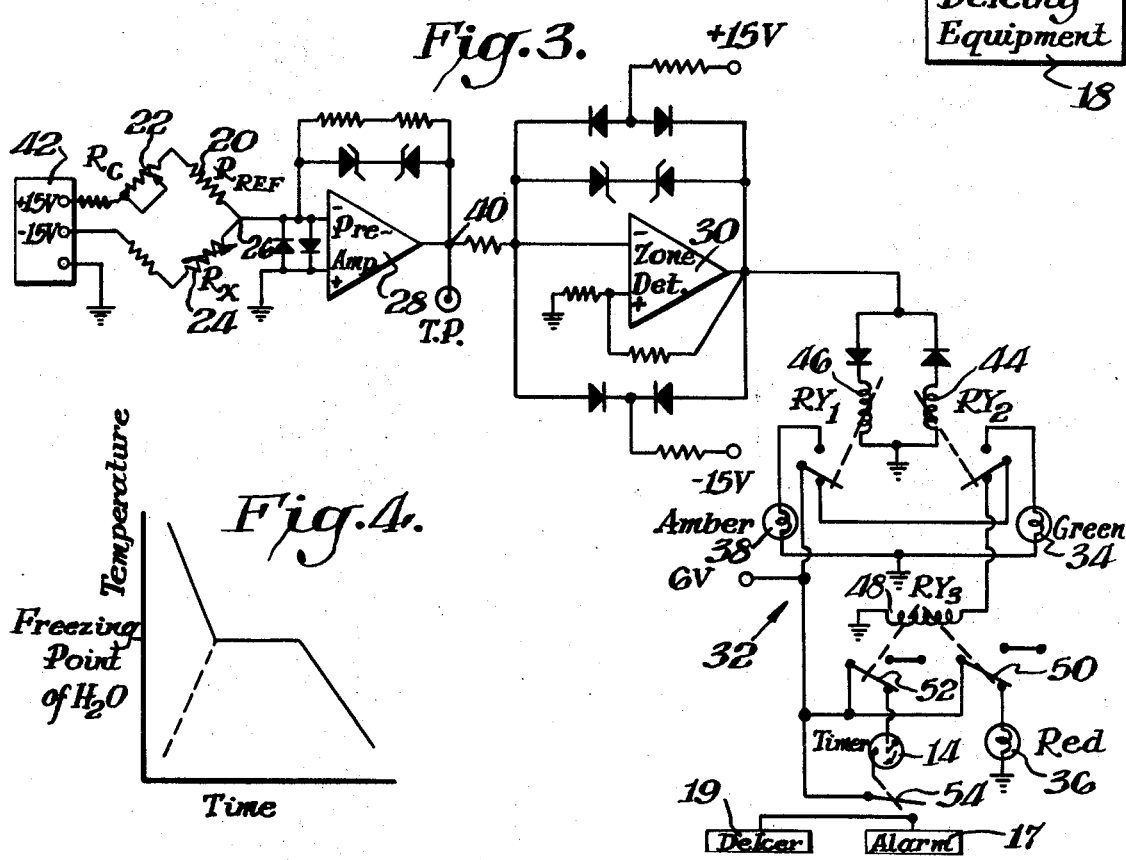

United States Patent Office 3,517,900
Patented June 30, 1970

3,517,900
PROCESS AND APPARATUS FOR DETECTING
ICE FORMATION
Philip A. Roussel, 111 Canterbury Drive, Windsor Hills,
Wilmington, Del. 19803
Filed June 11, 1968, Ser. No. 736,152
Int. Cl. B64d *15/22;* G01n *25/04;* G08b *19/02*
U.S. Cl. 244—134
10 Claims

ABSTRACT OF THE DISCLOSURE

Ice formation on the surface of an aircraft is detected and combated by sensing when the surface is in a predetermined temperature range which range includes the freezing point of water and then measuring the time that the surface remains in the range. After a predetermined amount of time has passed, the presence of ice formation conditions is indicated as by sounding an alarm and/or actuating deicing devices.

BACKGROUND OF INVENTION

It is well known that the presence of ice in or on certain critical areas of an aircraft structure or power plant can be very hazardous to flight. Numerous aircraft accidents have occurred as a result of ice forming in the carburetor of carbureted aircraft engines or on air foil surfaces such as wings, propellers, horizontal stabilizers, vertical stabilizers, or helicopter rotor blades. The formation of ice is hazardous—(1) it adds weight to the aircraft, (2) may reduce or prevent the proper intake of the air required for the efficient combustion of fuel in the power plant, (3) may severely reduce the aerodynamic efficiency of the airfoil and control surfaces, and (4) may severely unbalance the propeller, turbine, or helicopter rotor. Any or all of these conditions create serious hazard to the safety of continued flight. For this reason carbureted aircraft engines, whose carburetors are susceptible to partial or complete blockage of air intake by the formation of ice in the "throat" of the carburetor, are provided with means to heat the incoming air so as to avoid the formation of ice or to melt ice after it has begun forming. Unfortunately, all means to heat intake air reduce engine power, increase fuel consumption per unit of power output, and increase engine wear. Thus carburetor heaters, while vital, must be used with great care and only when needed or suspected to be needed. Carburetor heat is never used on take off, for example, because the full power output of which the power plant is capable is required for maximum safety during take-off. Carburetor ice control by the pilot is often a matter of guess-work because (1) carburetor ice can form under a wide range of atmospheric conditions and the pilot of the aircraft has no satisfactory way of predicting when ice may form, and (2) the pilot usually is unable to tell when ice formation has begun; unfortunately, his first signal that ice has begun to impair the flow of air into the carburetor will often be a sudden loss of power as indicated by "coughing" or "sputtering" of the engine or even total engine stoppage. Carburetor ice may form even though ambient air temperature is well above freezing, because the temperature in the throat of the carburetor may be reduced by evaporation of the fuel, and it may occur when there is no visible moisture in the atmosphere. The commonly used expedient of a sensor which detects air temperature in the carburetor thus provides only a crude indication of conditions in which ice may form, and may add to the hazard by giving the pilot a false sense of security.

Another major hazard to flight is the accumulation of ice on the exterior surfaces of air foils, air intakes, and control surfaces. The areas on which the accretion of ice occurs most rapidly and with the greatest hazard to the safety of continued flight are the leading edges of airfoil surfaces such as propellers, wings, horizontal stabilizers, vertical stabilizers, and helicopter rotor blades, and on other surfaces exposed to the impact of the air stream, such as speed brakes, spoilers, landing gear structure, etc. The accretion of ice on any surface is hazardous because of the burden of extra weight the aircraft must support. In addition to the extra weight, ice on airfoil surfaces greatly reduces the efficiency of these surfaces to perform their vital functions. Because the contour of the wing changes, its "lift" characteristics become impaired even to the extent that it may fail to support the aircraft; the airfoil characteristics of the propeller are similarly impaired, and it becomes less able to provide its full power output just at that critical time when, because of increased weight and reduced wing efficiency, more power is required. Further, ice may form unevenly and unbalance the propeller, thus imparting severe strain to the engine with the likelihood of severe damage or even total failure.

The formation of ice on airfoil surfaces occurs under a different set of atmospheric conditions than does the formation of ice in a carburetor. The ambient temperature must be at or below the freezing point of water, and visible moisture, as in a cloud or rain, must be present. Under these conditions supercooled water droplets will often crystallize to ice as they strike the leading edges, and cling to the leading edge. Ice formation may be very rapid—say, 1″ in a minute.

Many aircraft, such as commercial airliners, military aircraft, and some business aircraft are equipped with deicing devices the most prominent of which function (1) by heating the leading edge of the surface to be protected, (2) by means of an expandable "boot" whose inflation breaks away the accumulated ice, or (3) by means of an anti-icing fluid, such as ethylene glycol, which is sprayed over the surfacce to be protected to melt the ice. In normal flight practice these deicing devices are not used until that moment when it becomes essential to use them, because they either drain important amounts of power (heating devices), do not function adequately until a significant layer of ice is built up (expandable boot), or are rapidly depleted. Thus the devices cannot be operated until there is serious need for them.

The pilot of an aircraft in flight will often be unaware that ice has begun to form until its accretion is already serious. For example, on many high performance modern aircraft, the pilot cannot see the wing to determine whether ice is forming; virtually none can see the tail structure or the landing gear structure when extended. Ice is nearly impossible to see on a rotating propeller or helicopter rotor blade. Even in those aircraft in which the wing is in the pilot's line of vision, the accretion of ice may not be observed because it is hidden in dense cloud or by darkness, or because the pilot is busy flying on instruments or in a highly demanding situation such as flying in combat when he cannot direct his attention except to the immediate controls within the cockpit. On an instrument descent in bad weather for example, the pilot is too absorbed to check for ice formation.

SUMMARY OF INVENTION

An object of this invention is to provide a reliable, accurate and economical ice detecting method and apparatus which is particularly suitable for aircraft.

A further object is to provide such a method and apparatus which may include a warning system or may trigger deicing equipment to signal the pilot that ice has begun to form and to thereby prevent any significant formation of ice.

In accordance with this invention the temperature of an aircraft surface is measured and when the temperature falls within a predetermined range which includes the freezing point of water, a time delay mechanism is actuated. After a certain period of time has passed, the warning and/or deicing equipment is activated.

The invention may also include the feature of providing a warning to indicate the approach of ice formation conditions such as when the temperature is slightly above or below the predetermined range.

THE DRAWINGS

FIGS. 1–2 are schematic views of an apparatus in accordance with this invention, FIG. 3 indicates the circuitry for the apparatus of FIGS. 1–2; and FIG. 4 is a graphical illustration of a principle upon which this invention is based.

DETAILED DESCRIPTION

The ice detection system relies upon certain thermodynamic principles. For example the invention takes into account the principle that atmospheric moisture whether invisible as dispersed water vapor or visible as the condensed vapor in clouds, fog or rain is in effect distilled water. Accordingly, the moisture is substantially pure and, therefore, has a precise freezing point of 0° C. The invention also takes into account the principle that the temperature of ice formation under equilibrium or near-equilibrium conditions is precisely 0° C., regardless of the temperature of the surrounding media such as air and that so long as ice continues to form under such conditions its temperature will remain precisely at the freezing point of water. The invention also takes into account the principle that the formation of ice occurs over a finite time period. These principles are illustrated in FIG. 4 which indicates the temperature as a function of time wherein the temperature might drop at for example a constant rate until the freezing point of water is reached. The temperature then remains at the freezing point for a finite period of time during which ice forms and thereafter the temperature again drops.

With respect to the above indicated principle, it is noted that the formation of ice from liquid or gaseous water is accompanied by a large release of energy, for example 80 cal./gram for liquid water at 0° C. to ice at the same temperature and approximately 670 cal./gram for gaseous water to ice. This energy must be removed if ice is to form because as long as the energy remains the water will remain in its liquid or gaseous state. Removal of the energy is normally accomplished by transfer to the surroundings. For example in the case of the wing of an aircraft whose temperature is 0° C. or less coming into contact with airborne liquid water, the energy is removed by the material of the wing and by the air flowing over it. A vital quality of the transition from the liquid or gaseous stage to the crystalline or ice phase is that the release of energy is large enough so that the temperature of the ice as it forms under equilibrium or near-equilibrium conditions will be precisely 0° C. regardless of the initial temperature of the surface on which it forms or the temperature from the water from which it forms.

As an example of the above principle, if the wing of an aircraft moved through air having a temperature of —10° C. and there are super-cooled water droplets having a temperature of —10° C., typical aircraft icing conditions are present. As the water droplets impinge on the moving wing surface they may be converted to ice. This invention takes into account that their conversion will be accompanied by a rise in temperature from —10° C. to 0° C. The energy required to bring about this rise is the heat of crystallization which is released when crystallization begins. Similarly in the case of icing in the throat of a carburetor in which the air containing water vapor has a temperature of 15° C. and a surface of the carburetor throat is —5° C. because of the evaporation of fuel, the temperature of ice formation under substantially equilibrium conditions will again be precisely 0° C. This situation is represented by the broken line in FIG. 4.

These principles are used in the construction of the apparatus which is schematically illustrated in FIGS. 1–3 for reliably indicating the formation of ice and providing a practical form of distinguishing this formation from all other events.

FIG. 1 schematically illustrates the apparatus of this invention. As indicated therein a suitable temperature detector 10 is disposed upon for example the surface of an aircraft wing 12. When the temperature rises or falls into a predetermined range which includes the freezing point of water, timer 14 is actuated. After a predetermined amount of time passes, relay 16 transmits the sensing of the icing conditions to a deicing device 18 which automatically removes ice from the critical portions of the aircraft. As later described, relay 16 may simply be used to sound the alarm so that the pilot can actuate the deicing equipment.

FIG. 2 is a block diagram of the device illustrated in FIG. 1. As indicated therein temperature detector 10 includes for example a platinum resistance thermometer type of sensor having a resistance of 100 ohms±0.1% at 0° C. The reference leg 20 (FIG. 3) plus 22 of FIG. 3 is adjusted to match the sensor resistance 24 at this freezing point. The common junction 26 of 20 and 24 is the summing junction for the preamplifier 28. The output of the preamplifier 28 is then fed to a zone detector 30 which can detect three distinct states or connditions to a high degree of resolution. These conditions are fed to a visual warning indicator 32. The visual warning indicator 32 include for example a green light indicator 34, a red light indicator 36 and an amber light indicator 38. In one example of this invention the green light is used for indicating that the air temperature is at least a minimum of +0.25° C. within the accuracy of resistance sensor 24. The red light indicates the critical range between ±0.25° C. which may be considered as the dead zone or null point. The amber light indicates a temperature below this predetermined range or dead zone which is less than —0.25° C.

The particular temperature ranges and colors are quite satisfactory for this invention. It is to be understood, however, that other temperature ranges and colors may be selected in accordance with other equipment or within the desired degree of accuracy without departing from the spirit of this invention.

Referring again to the drawings, time delay mechanism 14 is preset to an appropirate interval such as for example 15 seconds in accordance with the requirements of the specific installation. Timer 14 delays the activation of the alarm or deicing equipment until this preset time interval has been exceeded. Accordingly, by the inclusion of this time delay a distinction is made between the formation of ice and conditions wherein there is merely transient temperatures near the freezing point.

Other sensors than 24 can also be used such as thermistors which would be directly interchangeable requiring only a matching resistance combination of 20 and 22 at the temperature of 0° C. Similarly thermocouples could be used for eliminating the need for a reference ±15 v. power supply although a zero reference thermocouple might be difficult too maintain to flight conditions.

FIG. 3 illustrates in greater detail the icing indicator or alarm system. An excitation current of 6 milliamps is supplied to the bridge made up of leg 24 in opposition to the combined resistance of 20 and 22 with the resistance thermometer being in an iced bath leg 22 and adjusted for zero current at summing point 26. This sets the null or dead zone condition to occur at 0° C. If the temperature at the sensor should rise above 0° C. an error current will appear at summing point 26 and a negative going signal will appear at the output of preamplifier 28 (which may be a chopper stabilized amplifier having a good stability). A decreasing temperature going below 0° C. will appear at point 40 as a positive going signal. With the temperature at 0° C. the preamplifier output is zero. The zone detector has a threshold of approximately ±60 microamps as determined by the 250K-ohm resistors in series with the ±15 v. power supply 42. If the sensor is subjected to a temperature above 0.25° C. the error current exceeds the minus 60 microamp threshold current of the zone detector. This trip point being determined by the overall gain of the system. In such case 44 is energized to activate the green light 34 indicating an above freezing point condition.

If the temperature at the sensor 10 falls within the dead zone range, the threshold current of zone detector 30 is not exceeded and relays 44 and 46 assume a deenergized state which turns on red light 36. The red light does not indicate the actual formation of ice state rather that one of the requirements of ice formation; namely, the critical temperature is present. Simultaneously with the energizing of red light 36, time delay mechanism 14 such as a clock timer is actuated. If the temperature remains within this dead zone range for in excess of a predetermined time delay preiod such as 15 seconds, the ice formation conditions are relayed by the timer to equipment 18.

If the temperature falls below −0.25° C., the error current exceeds the plus 60 microamp threshold current of zone detector 30 energizing relay 46 to light the amber indicator 38 thereby indicating a below freezing point condition. The hysteresis action in zone detector 30 causes a snap action turn-on and turn-off of 44 and 46 giving a positive indication of finite temperature zones. By adding relay 48 the red light and if desired, additional alarms can be energized through the contacts of relay 48.

As illustrated in FIG. 3, relay 48 is a double pole, double throw relay which is only actuated when relays 44 and 46 are in a deenergized state. This condition, of course, only occurs when the temperature at sensor 10 is in the dead zone range. When relay 48 becomes energized, the red light is actuated through contact 50 and the timer actuated through contact 52. The length of time that timer 14 is allowed to run before relaying the signal sound is, of course, predetermined by the specific application of the apparatus but must be sufficient to distinguish the formation of ice from brief adventitious experiences at 0°. If for example the 15 seconds time interval passes whereupon icing is apparent, contact 54 of timer 14 closes and may for example, sound alarm 17 or activate deicer 19 of the ice combating equipment 18. If the temperature remains within the dead zone range for less than the 15 second time period, relay 48 would deenergize to thereby stop timer 14 and reset it. This condition would indicate a non-icing state and either a green or amber light would come on.

Any suitable deicing equipment may be triggered by timer 14. Such equipment may include, for example a conventional heating device or an expandable boot. Examples of such heating equipment may be found in U.S. Pat. 2,359,787 and examples of expandable boots and are found in U.S. Pats. 2,182,547 and 2,541,512. By suitable modification of the circuitry, the deicing equipment could be automatically shut-off when the icing conditions are no longer present.

As previously indicated the sensor may be placed on the surface of an aircraft wing or in the throat of a carburetor. Where desired this invention may also be utilized with other objects than merely aircraft although it is particularly suited for aircraft.

Obviously many other modifications and variations of the present invention are possible in light of the above teachings. It is, therefore, to be understood that the invention may be practiced otherwise than specifically described.

Other such modifications include adapting the circuitry so that lights 34 and 38 are turned on only during limited temperature ranges above and below the dead zone range. Outside these ranges certain color lights, such as white, may be constantly on. When, for example, the temperature falls slightly above the dead zone, green light 34 will then turn on warning the pilot of the approach of ice conditions and finally, when the critical range is reached the red light 36 will turn on.

It is also possible to adapt the system for the detection of conditions other than ice formation, as long as the conditions are characterized by a substantially constant predeterminable temperature for a finite time period.

What is claimed is:

1. In a process for combating ice formation on a surface of an aircraft including sensing when the temperature of said surface is in a predetermined dead zone temperature range which range includes the freezing point of water, measuring the time that said surface is in said predetermined range, and indicating the presence of ice formation conditions after a predetermined amount of time has been measured.

2. In the process of claim 1 including indicating the approach of ice conditions when the temperature is outside said dead zone range.

3. In the process of claim 2 wherein the presence of ice formation conditions is indicated by actuating an alarm.

4. In the process of claim 3 including automatically actuating deicing equipment when said predetermined amont of time has elapsed.

5. In the process of claim 4 wherein said dead zone range is from about 0.25° C. to −0.25° C. and said predetermined amount of time is about 15 seconds.

6. An apparatus for use in combating ice formation on the surface of an aircraft comprising a sensor for measuring the temperature of the surface, time delay means connected to said sensor to be actuated when the temperature of the surface as sensed by said sensor is in a predetermined dead zone range which includes the freezing point of water, and triggering means actuated by said time delay means after a predetermined period of time has elapsed for indicating the presence of ice formation conditions.

7. An apparatus as set forth in claim 6 including visual indicating means actuated by said sensor for selectively indicating when the temperature is within and outside of said dead zone range.

8. An apparatus as set forth in claim 7 wherein said indicating means includes a light which is turned on when the temperature is in said dead zone range, and relay means for turning on said light and simultaneously beginning the operation of said time delay means, said relay means resetting said time delay means when the temperature remains in said dead zone range for a period of time less than said predetermined period of time.

9. An apparatus as set forth in claim 8 wherein said indicating means includes visual means for differentiating when the temperature is above and is below said dead zone range.

10. An apparatus as set forth in claim 9 including alarm means and deicing means actuated by said triggering means.

References Cited

UNITED STATES PATENTS 3,276,254  10/1966  Richard _____ 73—17
3,305,851  2/1967   Brandtszteter _____ 73—336.5
3,422,677  1/1969   Lockwood _____ 73—336.5

S. CLEMENT SWISHER, Primary Examiner

D. E. CORR, Assistant Examiner

U.S. Cl. X.R.

73—17, 336.5; 340—27